S. LOE.
TRANSMISSION MECHANISM.
APPLICATION FILED MAY 7, 1919.

1,349,074.

Patented Aug. 10, 1920.
4 SHEETS—SHEET 1.

Fig. 1

Inventor.
Syver Loe.
By his Attorneys
Williamson Merchant

S. LOE.
TRANSMISSION MECHANISM.
APPLICATION FILED MAY 7, 1919.
1,349,074.
Patented Aug. 10, 1920.
4 SHEETS—SHEET 2.
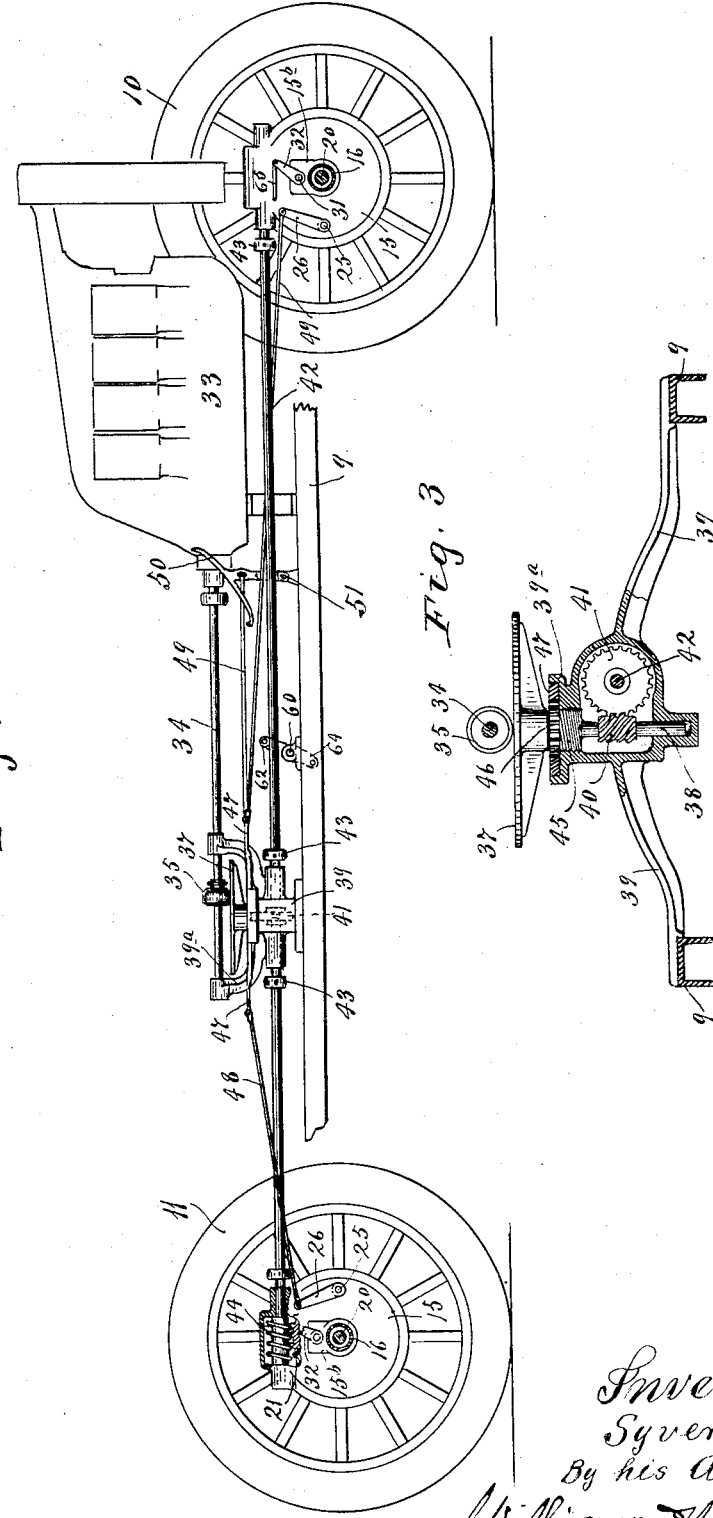
Inventor.
Syver Loe.
By his Attorneys
Williamson Merchant

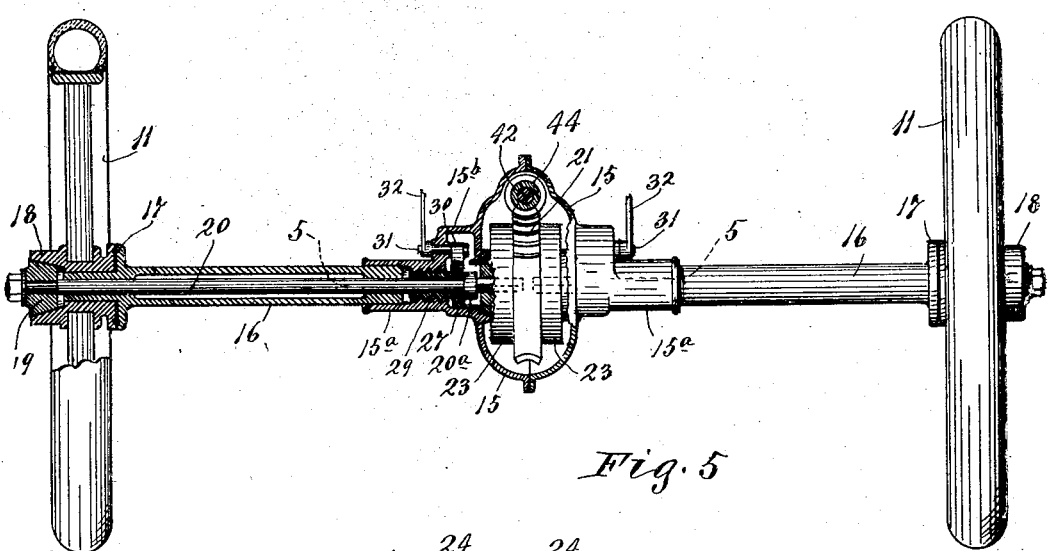

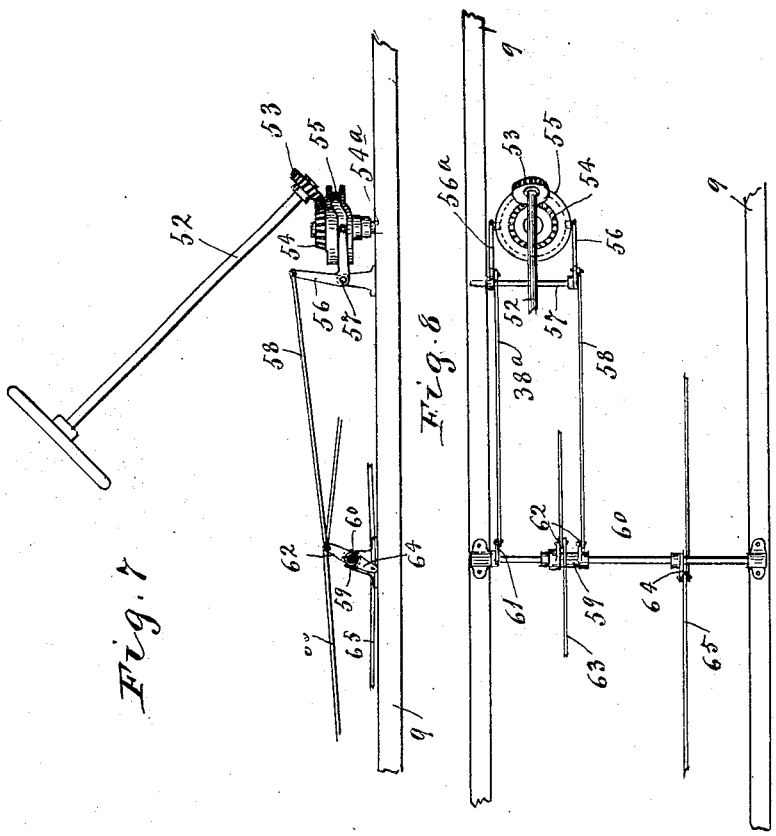

UNITED STATES PATENT OFFICE.

SYVER LOE, OF MINNEAPOLIS, MINNESOTA.

TRANSMISSION MECHANISM.

1,349,074. Specification of Letters Patent. Patented Aug. 10, 1920.

Application filed May 7, 1919. Serial No. 295,429.

*To all whom it may concern:*

Be it known that I, SYVER LOE, a citizen of the United States, residing at Minneapolis, in the county of Hennepin and State of Minnesota, have invented certain new and useful Improvements in Transmission Mechanism; and I do hereby declare the following to be a full, clear, and exact description of the invention, such as will enable others skilled in the art to which it appertains to make and use the same.

My invention relates to motor propelled vehicles and has for its object to provide an improved transmission mechanism therefor, whereby all four of the wheels of the vehicle may be simultaneously driven, as when driving straight ahead, or the wheels on the opposite side of the vehicle may be independently driven, as when turning a curve.

Generally stated, the invention consists of the novel devices and combinations of devices hereinafter described and defined in the claims.

The invention consists chiefly in the transmission mechanism but involves, also, a novel relative arrangement therewith, of steering mechanism.

In the accompanying drawings which illustrate the invention, like characters indicate like parts throughout the several views.

Referring to the drawings:—

Figure 1 is a plan view with some parts broken away, showing the invention applied to a truck;

Fig. 2 is a side elevation with some parts sectioned showing the invention applied to the truck as illustrated in Fig. 1;

Fig. 3 is a vertical section showing details of the transmission mechanism on a larger scale than in Fig. 2;

Fig. 4 is a rear elevation with some parts sectioned, showing rear axle and rear wheel structure;

Fig. 5 is a horizontal section with some parts in full, on the line 5—5 of Fig. 4;

Fig. 6 is a transverse vertical section taken on the line 6—6 of Fig. 5;

Fig. 7 is a side elevation of the steering mechanism; and

Fig. 8 is a plan view of the parts shown in Fig. 7, some parts being broken away.

The main frame of the vehicle is indicated, as an entirety, by the numeral 9. The front wheels of the vehicle are indicated by the numeral 10, the rear wheels by the numeral 11. The front and rear axle structures are substantially identical, except that the front axle is provided with trunnions 12 on which the front wheels are journaled. The said trunnions have the customary arms 13 connected by a transverse rod 14.

The rear axle structure will first be described. It comprises a centrally located casing 15, having outwardly centered axially alined axle sleeves 16, formed on its outer end with trunnions 17 on which the rear wheels 11 are journaled. The hubs of the wheels 11, on their outer ends, are formed with internal cone clutch members 18 with which coöperate cone clutch members 19. The cone clutch members 19 are rigidly secured to the outer ends of rear axle shafts 20. The inner ends of the shafts 20 are squared, or made rectangular in cross section and are separated at the central portion of the axle. Located within the casing 15 is a large worm gear 21 with large hubs journaled at 22 in suitable bearings formed in the side of the casing 15. The angular inner end of the axle shafts 20 fit correspondingly formed seats in the hubs of the worm gear 21, so that the two shafts are caused to rotate with the worm gear, but are capable of slight endwise movement in respect thereto. The hubs of the gear 21 are formed with brake drums 23. Located within the casing 16 and working, one on each of the drums 23, are spring metal brake bands 24. The ends of these brake bands 24 are pivotally anchored to short arms of a rock shaft 25 journaled in the side of the casing 15 and provided at their outer ends with crank arms 26. The connection for independently operating the rock shaft 25, and hence, the two brake bands 24 will be hereinafter described.

Here it should be noted that the rear axle and the front axle structure will be anchored to the framework 9, in the usual or in any suitable way. Rotatively mounted on the axle shaft 20 adjacent to shoulders or rigidly attached collars 20ª, are spur gears 27 that have extended sleeve-like hubs formed with external screw threads 29. The screw threads 29 engage internal screw threads 28 formed in sleeve-like hubs 15ª of the casing 15.

The spur gear 27 independently meshes with segmental pinions 30 that are secured to the inner ends of short shaft 31, which shaft extends through the reduced side portions 15ᵇ of casing 15 and are provided with upwardly extended arms 32.

The front axle structure involves all of the above described details of the rear axle and associated parts and further, as already stated, is mounted on pivoted trunnions 12. Here it may be further stated that the shaft 20 of the front axle also has knuckle joints of well known construction, to permit the pivotal movement of the trunnions 12. This construction, in this respect, is the same as generally employed in four wheel tractors, and the like.

Mounted on the frame 9 is a driving motor in the form of a multicylinder explosive engine indicated, as an entirety, by the numeral 33. This engine has an extended crank shaft 34 mounted in suitable bearings on the framework 9. The extended end of crank shaft 34 carries a small peripheral wheel 35 that is free to slide thereon, and is adapted to be set in different adjustments by a spherical shipper rod 36. The small peripheral wheel 35 works over and is adapted to frictionally engage with the upper face of a large friction wheel 37 which is carried by the upper end of a short vertical shaft 38, mounted in a cross bracket 39 secured on the main frame 9.

Shaft 38 carries a worm 40 that meshes with the worm gear 41 carried by a longitudinal driving shaft 42. Worm gear 41 works in a housing formed by the intermediate portion of cross bracket 39. This cross bracket also carries a support for the intermediate portions of the transmission shaft 42. This transmission shaft is a jointed shaft and has a plurality of knuckle joints 43. The front and rear end sections of transmission shaft 42 carries worms 44 that mesh, respectively, with the front and rear worm gears 21, already described.

With the above connections, the two worm gears 21 will always be driven when the face friction wheel 37 is driven. Face friction wheel 37 is adapted to be thrown out of action, by vertical movements which carry the same into or out of frictional engagement with driving friction wheel 35. For this purpose, the upper portion of shaft 38, (see Fig. 3), is extended through and journaled in a screw-threaded plug 45. This plug 45 has threaded engagement with the hollow central portion 39ᵃ of bracket 39, and it carries a spur gear 46 that meshes with two racks 47 mounted to slide in the upper portion of the portion 39ᵃ of bracket 39.

The numeral 48 indicates a link which, at its front end, is forked and connected to the arms 26 of the two front brake devices. The numeral 49 indicates a similar link, the rear end of which is forked and connected to the arms 26 of the two rear brake devices. The inner end of the two links 48 and 49 are connected, the one to one of the racks 47 and the other to the other of said racks.

One of the racks 47 is connected, by a link 49 to a foot pedal 50 that is pivoted to a suitable support on the frame 9 at 51.

The steering connections preferably employed are as follows. The numeral 52 indicates an ordinary steering post provided at its lower end with a bevel gear 53 that meshes with a beveled gear 54 carried by the upper face of a cam 55 mounted to rotate on a vertical spindle 54ᵃ on the main frame 9. Cam 55 has a peripheral groove that operates on the roller-equipped ends of a pair of laterally spaced bell crank levers 56—56ᵃ mounted on a supporting shaft 57 for independent vibratory movements. The upper arm of bell crank 56 is connected by a rod 58 to one arm of a sleeve 59 that is mounted to oscillate on a transverse rod 60 mounted to rock in bearings on the frame 9. The upwardly extended arm of bell crank 56ᵃ is connected by a rod 58ᵃ to the upwardly extended arm 61 of said rock shaft 60. Rock sleeve 59 has a second arm 62 that is connected by a rod 63 to the right hand front and rear clutch actuating arm 32. Rock shaft 60 has a second arm 64 that is connected by a rod 65 to the front and rear left hand clutch operating arm 32.

The operation of the mechanism described, briefly summarized, is substantially as follows.

It will, of course, be understood that when one of the gears 27 is oscillated, as already described, the coöperating threaded elements 28 and 29 will produce an endwise movement of the corresponding clutch operating shaft 20. When the shaft 20 is moved inward, the clutch members will be clamped together so that the wheel will be driven and when the said shaft is moved outward the clutch member will be released, so that the wheel will run loose or free. In the drawings I have shown cone-clutch members, but it will be understood that any suitable form of clutch devices may be employed.

The manner in which the transmission mechanism is thrown out of action and the brakes set simultaneously therewith, or the transmission mechanism thrown into action and the brakes released simultaneously therewith, or a little in advance thereof, by manipulation of the foot pedal 50, has already been described.

The customary connection is between the steering post or shaft 52 and the transverse rod 14 that connects the knuckle arms 13 of the front wheels for steering the machine will, or may be employed, but the same being well known, are not here illustrated.

Rotation of the steering post 52 in a direction to cause the machine, for example, to turn toward the right, will move the high part of the cam channel of cam wheel 55 to the left hand side, causing the same to operate on left hand bell crank 56ª and throw the connections described, will simultaneously set the wheel clutches on the left hand side of the machine, leaving the wheel clutches on the right hand side of the machine both released, so that the driving of the machine when turning a curve, will be produced by the wheels that are traveling on the outer side of the curve.

When the cam wheel 55 is in the position shown in Fig. 7, the wheel clutches front and rear on both sides of the machine, that is for all four wheels, will be set, so that the machine will be driven forward but through all four wheels acting in traction. In this position of the cam wheel, the customary steering connections will set the wheels all parallel for straight ahead travel.

When the steering post 52 is turned in a direction to cause the machine to turn a curve toward the right, the high part of cam 55 will be turned to the left and, operating on the left hand bell crank 56ª through the connections described, will simultaneously release the right hand front and rear wheel clutches, so that the machine will then be driven through the left hand front and rear wheels, traveling on a large arc of the curve. When the steering post is turned in the reverse direction so as to cause the machine to turn a curve toward the left, the high part of the cam 54 will be turned toward the right, thereby acting on right hand bell crank 56, and through the connections described, will simultaneously release the front and rear left hand wheel clutches, so that the machine will then be driven through the right hand front and rear wheels.

This transmission mechanism, as is obvious, eliminates the necessity of a differential gear mechanism and gives a positive drive for the wheels so that the slipping of one wheel cannot interfere with the tractive action of the other wheel.

Many of the novel features above described are capable of use in motor propelled vehicles having but two traction wheels located, one on each side thereof.

What I claim is:

1. In a motor-propelled vehicle, the combination with an axle casing and traction wheels journaled on the ends thereof, of a motor on said vehicle, a driving axle mounted in said casing and extending therethrough to points outward of said traction wheels, clutches applied to the outer ends of said axle and to the outer sides of the wheel hubs, and transmission mechanism connecting said engine to said driving axle, and a steering device having connections for independently or simultaneously rendering said two clutch devices operative.

2. In a motor-propelled vehicle, the combination with front and rear axle casings, of front and rear traction wheels mounted on journals at the ends of said axle casings, driving axles in said axle casing extended through the hubs of the respective traction wheels, clutches applied between the outer ends of said driving axles and the outer sides of the hubs of the respective traction wheels, an engine on said vehicle, and transmission mechanism connecting said engine to said front and rear driving axles, and a steering device having connections for independently or simultaneously rendering said two clutch devices operative.

3. In a motor propelled vehicle, the combination with front and rear wheels and a motor on said vehicle, of a transmission mechanism including means whereby, at will, all four of said wheels may be driven, or, at will, the front and rear wheels on either side may be driven while the front and rear wheels on the opposite side are disconnected and permitted to run loose, the said means including clutches applied to the hubs of the respective wheels, motor-driven axle shafts connected to and rotated with the movable clutch members, and clutch-actuating thrust devices comprising relatively fixed and movable coöperating screw-threaded elements, the latter having thrust actions on the respective axle shafts to set and release the clutches.

4. In a motor propelled vehicle, the combination with front and rear wheels and a motor on said vehicle, of a transmission mechanism including means whereby, at will, all four of said wheels may be driven, or, at will, the front and rear wheels on either side may be driven while the front and rear wheels on the opposite side are disconnected and permitted to run loose, the said means including clutches applied to the hubs of the respective wheels, said means comprising front and rear motor driven gears, front and rear axle shafts driven from said front and rear gears and connected to and rotated with the movable clutch members, a threaded gear-equipped sleeve having a thrust action, one on each of the axle shaft sections relatively fixed threaded elements with which said threaded sleeve is engaged to release and set the clutches, and an arm-equipped gears meshing with the sleeve gears to oscillate the same.

5. In a motor propelled vehicle, the combination with an axle casing and traction wheels journaled on the ends thereof, of a two-section driving axle mounted in said casing and extended therethrough to points outward of said traction wheels, clutches applied to the outer ends of said axle and to the outer sides of said wheels, a motor on said vehicle having connections for simultaneously driving the two sections of said axle, and independently operative screw-threaded elements for imparting axial movements to the sections of said axle to thereby set and release said clutch.

6. In a motor propelled vehicle, the combination with an axle casing arranged to carry the load, of traction wheels journaled at the ends of said axle casing, an axle shaft made up of sections journaled in said axle casing with freedom for endwise movements, clutches for connecting the outer ends of the axle sections to the respective wheels, said clutches being operative by endwise movement of said axle sections, a steering mechanism for said vehicle, and clutch actuating connections operated automatically from said steering mechanism and including devices for independently producing endwise clutch operating movement to said axle sections.

7. In a motor propelled vehicle, the combination with an axle casing carrying the load and traction wheels journaled at the ends of said axle casing, a driving shaft journaled in said axle casing free from the load weight, clutches for connecting the ends of said axle shaft to the respective wheels, a steering mechanism, and a clutch actuating device automatically operated by said steering mechanism and operative to throw said clutches, both into action when the steering mechanism is set for straight ahead travel and to throw one or the other of the clutches out of action when the steering mechanism is set to cause the machine to travel a curve in one direction or the other, and a motor on said vehicle having connections for driving said axle shaft, brake mechanism for said traction wheels, and manually operated means whereby said brake mechanism will be released when the motor is coupled to the transmission mechanism and will be set when said motor is uncoupled from the transmission mechanism.

In testimony whereof I affix my signature in presence of two witnesses.

SYVER LOE.

Witnesses:
CLARA DEMAREST,
BERNICE G. BAUMANN.